United States Patent [19]

Ishii

[11] Patent Number: 4,756,680
[45] Date of Patent: * Jul. 12, 1988

[54] APPARATUS FOR HIGH EFFICIENCY HOT ISOSTATIC PRESSING

[75] Inventor: Takahiko Ishii, Kobe, Japan

[73] Assignee: Kabushiki Kaisha Kobe Seiko Sho, Kobe, Japan

[*] Notice: The portion of the term of this patent subsequent to Sep. 18, 2001 has been disclaimed.

[21] Appl. No.: 843,689

[22] Filed: Mar. 25, 1986

Related U.S. Application Data

[62] Division of Ser. No. 676,294, Nov. 29, 1984.

[30] Foreign Application Priority Data

Nov. 29, 1983 [JP] Japan ............................ 58-226155

[51] Int. Cl.⁴ .................................................. B22F 3/12
[52] U.S. Cl. ........................................ 425/78; 419/49; 425/405.2; 432/199
[58] Field of Search ................ 432/199, 247, 249; 219/400; 266/251–255; 425/77, 78, 405 H, 405 R, 406, DIG. 26; 419/49

[56] References Cited

U.S. PATENT DOCUMENTS

| 3,606,286 | 9/1971 | Lundstrom | 264/125 |
| 4,013,394 | 3/1977 | Witkin et al. | 425/405 H |
| 4,217,087 | 8/1980 | Bowles | 425/405 H |
| 4,349,333 | 9/1982 | Bowles | 432/205 |
| 4,471,949 | 9/1984 | Ishii | 425/405 H |
| 4,478,626 | 10/1984 | Moritoki et al. | 425/405 H |
| 4,491,302 | 1/1985 | Asari et al. | 425/78 |
| 4,537,569 | 8/1985 | Asari et al. | 425/405 H |

FOREIGN PATENT DOCUMENTS

| 3239316 | 6/1983 | Fed. Rep. of Germany . |
| 2101565 | 3/1972 | France . |
| 2352585 | 12/1977 | France . |
| 48-8689 | 3/1973 | Japan . |
| 57-106572 | 7/1982 | Japan . |
| 58-71301 | 4/1983 | Japan . |
| 58-157300 | 10/1983 | Japan . |
| 59-54098 | 4/1984 | Japan . |
| 60-116702 | 6/1985 | Japan . |
| 1291459 | 10/1972 | United Kingdom . |
| 1341888 | 12/1973 | United Kingdom . |
| 424657 | 10/1974 | U.S.S.R. .................... 425/405 H |

Primary Examiner—Jan H. Silbaugh
Assistant Examiner—Jill L. Fortenberry
Attorney, Agent, or Firm—Oblon, Fisher, Spivak, McClelland & Maier

[57] ABSTRACT

A process for high efficiency hot isostatic pressing in a hot isostatic pressing treatment for sintering or densifying a ceramic or metallic workpiece in a high temperature and high pressure gas atmosphere, which includes preheating the workpiece outside a high pressure vessel prior to the hot isostatic pressing treatment, transferring the preheated workpiece as surrounded with the gas in a hot state into the high pressure vessel, then treating the workpiece at high temperature and high pressure in a gas atmosphere, thereafter taking out the workpiece from the high pressure vessel together with the gas atmosphere, then cooling the workpiece if necessary, and subsequently taking it out from the gas atmosphere, as well as an apparatus for practicing the above-noted process, wherein a treating chamber for effecting the hot isostatic pressing treatment is covered with a hermetic casing, and at least one valve mechanism capable of providing communication and cut-off between the interior and exterior of the treating chamber is provided in each of upper and lower portions of the treating chamber.

7 Claims, 6 Drawing Sheets

APPARATUS FOR HIGH EFFICIENCY HOT ISOSTATIC PRESSING

This is a division of application Ser. No. 676,294, filed Nov. 29, 1984.

BACKGROUND OF THE INVENTION (1) Field of the Invention

The present invention relates to an improvement of modular type hot isostatic pressing (hereinafter referred to as "HIP") method and apparatus provided with preheating or cooling auxiliary stations for sintering or densifying ceramic or metallic powder at high temperature and pressure in an inert gas atmosphere to obtain a molded product having a dense texture of a nearly true density.

(2) Description of the Prior Art

The HIP treatment has recently been specially noted in various fields as a superior method for compressing a work isotropically at a high temperature using an inert gas as a pressure medium to produce a dense sinter from ceramic powder, metallic powder, or a mixture thereof, or for removing residual cavities in cemented carbides by squeezing, or for diffusion-bonding of metallic materials.

According to the HIP method, there can be obtained various advantages such as, for example, high densification at low temperatures, obtaining of a dense and uniform texture having a density close to a theoretical value, improvement of mechanical and physical properties of powder, molding of powder unsuitable for molding, producing of large-sized products not restricted by the capacity of a press as in ordinary molding presses, molding of various composite materials such as metals and ceramics, and improvement of the material yield. By the HIP treatment, moreover, internal defects of an object can be removed, and the toughness and deflective strength can be enhanced, so methods which utilize this effect have been proposed other than the above-mentioned powder molding and sintering, such as improvement of the performance of sintered tool material, etc. and diffusion-bonding of the turbine blade and body by HIP to obtain extremely strong bonding.

Since such HIP treatment is performed in an atmosphere of high temperature and pressure, it is necessary to use an HIP furnace of a special structure, and a long period of time is required for executing the operation cycle comprising raising the temperature, raising the pressure, maintaining the elevated temperature and pressure, lowering the temperature and lowering the pressure. Therefore, shortening this cycle time and thereby improving the efficiency has been an important technical problem.

In a effort to solve the above-mentioned problem, various attempts have been made for improving the utilization efficiency per unit time of the HIP furnace by performing heating in a preheating furnace to raise temperature which requires a long period of time and performing in the HIP furnace only the raising of the pressure and/or raising the temperature to a slight extent. A typical example is the apparatus proposed in the specification of British Pat. No 1,291,459. However, this proposed apparatus is disadvantageous in that the equipment cost is increased because a preheating furnace is needed in addition to the ordinary HIP furnace although the shortening of the cycle time is attained, in that the heat loss caused by heat radiation from the work is very large because the conveyance of the work after preheating is performed in the air, and in that when the high-temperature work after preheating is charged into the HIP furnace, the lower inner wall surface of the furnace is overheated and the lower seal ring is easily damaged thereby, which is a serious problem.

In this type of apparatus for which safety is strictly required, the adoption of the above-mentioned apparatus is very problematic even if the shortening to the cycle time is attained As the material of heating element used in the heater, usually an electric heater, in the HIP furnace, there has been proposed Fe-Al-Cr, molybdenum of graphite. Among these materials, Fe-Al-Cr, which is resistant to oxidation at high temperatures, has been evaluated as the only material capable of being released to the air at a high temperature, but the temperature at which this material can be used stably is up to about 1,100° C.

On the other hand, molybdenum- or graphite-based materials which are stably employable at above 1,100° C. are severely oxidized at high temperatures, so cannot safely be exposed to the air unless the temperature range is below about 200°–300° C. Therefore, a long period of time is required for lowering the temperature to below 300° C. although the lowering of pressure can be done in a relatively short time period after performing the HIP treatment at a temperature as high as one thousand and several hundred degrees centigrade in a high pressure inert gas atmosphere. Thus, the long period of time required from opening the HIP furnace until taking out of the work greatly impedes efficient utilization of the apparatus. As an example, according to a certain conventional typical pattern in the HIP treatment, the time required for each treating step is as follows:

| Step | Time required | |
|---|---|---|
| | hr. | min. |
| Loading of workpiece | 0. | 10 |
| Vacuum suction, Gas replacing | 1. | 00 |
| Raising temp., Raising pressure | 3. | 00 |
| Maintaining elevated temp. and pressure | 2. | 00 |
| Lowering temp. | 8. | 00 |
| Recovery under reduced pressure | 1. | 00 |
| Taking out of workpiece | 0. | 10 |
| Total | 15. | 20 |

By the foregoing preheating, the 3 hours' temperature and pressure raising time is shortened to about 1 hour and 40 minutes, corresponding to only an 8.7% reduction of the cycle time, that is, the time required for lowering temperature, which occupies the greater part of the cycle time, still remains as a serious efficiency impeding factor.

For shortening the time required for lowering temperature, it has been previously attempted to perform natural cooling by providing a coolant jacket around the outer periphery of the HIP furnace and utilizing, in lowering the temperature, convection of gas induced by the difference between the specific gravity (small) of the high temperature gas at the furnace central portion and the specific gravity (large) of the low temperature gas in contact with the furnace inner wall, as disclosed, for example, in the specification of U.S. Pat. No. 4,217,087 and Japanese patent publication No. 8689/1973. According to such method, however, the cooling capacity deteriorates to a large extent with a decrease of the temperature difference between the high temperature gas and the low temperature gas. Therefore, the temperature lowering rate becomes smaller as cooling advances, and as a result, it is impossible to expect a remarkable shortening of the time required until reaching the temperature at which the HIP furnace can be opened.

In such technical level, the applicant of the present invention has previously proposed (see Japanese patent Laid Open publication No. 71301/1983) an HIP system capable of shortening the cycle time without exerting a bad influence on its components and having a high safety, as well as a method capable of improving the working efficiency remarkably by using such system. This proposed HIP system, called a modular type HIP system, comprises an HIP furnace, a plurality of auxiliary stations, the HIP apparatus and the auxiliary stations being disposed side by side along and above a horizontally laid track, and a carriage for travelling on the track. The HIP apparatus consists mainly of a high pressure vessel and a treating chamber and is provided with means for supply and discharge of an atmospheric gas for applying HIP treatment to a work piece loaded into the treating chamber and is also provided with means for adjusting pressure and temperature, the high pressure vessel comprising a pressure-resistant vertical cylinder having a closed top removably fitted in the bottom of the cylinder, the treating chamber being enclosed with an inverted cup-like heat insulating barrier which barrier is mounted on the upper surface of the barrier and is internally provided with a heater. Each of the auxiliary stations mainly comprises a dome-like vessel having a size which permits the treating chamber to be completely enclosed therein, also having a bottom opening which permits the above plug to be fitted therein, and further having a coolant jacket provided around the outer periphery thereof. Each auxiliary station is also provided with the heater enclosed therein together with the treating chamber, means for supply and discharge of an atmosphere gas for heating or cooling the work piece and temperature adjusting means.

Thereafter, the applicant of the present invention has made various improvements on the above-proposed apparatus and filed the thus-improved apparatus (see Japanese Utility Model Laid Open publication Nos. 157300/1983 and 54098/1984). According to these devices, in the foregoing modular type HIP system, a single valve mechanism is provided in the upper or lower portion of a casing which houses the treating chamber. This valve mechanism is opened when the treating chamber is inserted into the HIP furnace or an auxiliary station, to thereby provide communication between the interior and exterior of the treating chamber, and it is closed when the treating chamber is taken out. According to this construction, it is possible to take out the workpiece which has been preheated in the auxiliary station, from the auxiliary station integrally with the treating chamber together with the inert atmospheric gas, convey and load the workpiece into the HIP furnace, then after HIP treatment and upon dropping of pressure, take out the workpiece from the HIP furnace integrally with the treating camber immediately without waiting for such becoming cold, and cool it in an auxiliary station. Thus, a remarkable shortening of the cycle time in the HIP treatment and a great improvement of the working efficiency could be attained. In these devices, however, since the casing which hermetically encloses the treating chamber is taken out from the HIP furnace also under a state of high temperature, there arises the foregoing serious problem that the seal ring attached to the lower portion of the high pressure vessel is easily damaged when opening the HIP furnace in a still hot condition of its interior and taking out the treating chamber held at a high temperature.

SUMMARY OF THE INVENTION

The present inventors have carefully reviewed the foregoing prior art and studied about the method of ensuring an efficient and safe operation of the entire system while making the most of the advantages of the modular type and without impairing the utilization efficiency of the HIP furnace. As a result, the present inventors have been able to solve all of the conventional problems by cooling the work rapidly to an appropriate temperature in the HIP furnace after HIP treatment, and have thus reached the present invention.

As an apparatus employable for practicing such method of the present invention, there is provided according to the invention an apparatus characterized in that, in an HIP furnace consisting mainly of a high pressure vessel comprising a pressure-resistant vertical cylinder having one closed end and a plug removably fitted closely in an opening portion at the other end of the cylinder, and a treating chamber surrounded with a heat insulating barrier and capable of being attached to and detached from the high pressure vessel together with a workpiece loaded therein, the heat insulating barrier being attached to and detached from the high pressure vessel together with a workpiece loaded therein, the heat insulating barrier being internally provided with a heater. The HIP furnace is further provided with a gas supply and discharge means for subjecting the workpiece to a predetermined high temperature and high pressure treatment in a gas atmosphere. The auxiliary stations are each constituted mainly of a vertically oriented cylinder capable of enclosing therein the treating chamber hermetically, and provided with a gas supply and discharge means. The carrier device is for carrying the treating chamber together with the workpiece between the HIP furnace and each auxiliary station and loading and loading it to and from each vertical cylinder. In such HIP system, said treating chamber is covered hermetically with a casing and at least one valve mechanism capable of providing communication or cut-off between the interior and exterior of the treating chamber is provided in each of upper and lower portions of the treating chamber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2 to 5 are schematic views showing structures and operations of various portions in FIG. 1, of which

DESCRIPTION OF THE PREFERRED EMBODIMENTS

The method and apparatus of the present invention will be described in detail hereinunder with reference to the accompanying drawings.

Figure 1:
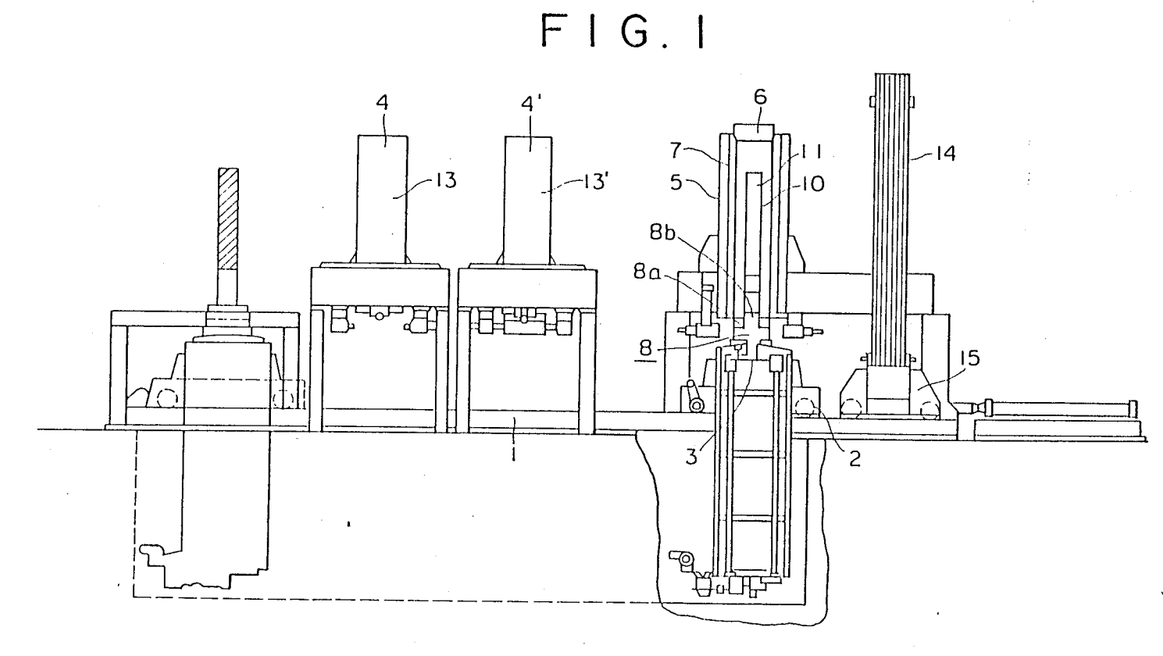
FIG. 1 is a schematic view of a modular type HIP system embodying the present invention.

FIG. 1 is a schematic explanatory view showing a positional relation between an HIP furnace and auxiliary stations in a modular type HIP system according to an embodiment of the present invention, in which a carriage 2 is mounted for travelling on a track 1, and on the carriage 2 is mounted a support table 3 capable of being vertically moved by a known or commonly used drive means (not shown) such as, for example, a chain wind-up type, worm gear and rack type, or piston type drive means. Above and along the track 1 are disposed side by side a plurality of auxiliary stations 4, 4', . . . and an HIP furnace 5. The HIP furnace 5 is constructed mainly of a high pressure vessel comprising a vertical, pressure-resistant cylinder 7 having a top portion closed hermetically with an upper plug 6 and a lower plug 8 capable of being fitted in the bottom of the cylinder 7 hermetically and removably, and a treating chamber 11 surrounded with an inverted cup-like heat insulating barrier 10 which is mounted on the upper surface of the lower plug 8 and enclosed in the high pressure chamber and which is internally provided with a heater. The treating chamber 11 can be removed to the exterior of the HIP furnace 5 by removing the heat insulating barrier 10 and the lower plug 8 together from the pressure-resistant cylinder 7. On the other hand, the auxiliary stations 4, 4', . . . mainly comprise vertical cylinders 13, 13', . . . and they each have capacity and size sufficient to completely enclose therein the treating chamber 11. The bottom opening of each of the vertical cylinders 13, 13', . . . has size shape which permit the lower plug 8 to be fitted therein.

The treating chamber 11, which is mounted on the support table 3 of the carriage 2, can be positioned just under the vertical, pressure-resistant cylinder 7 or any of the vertical cylinders 13, 13', . . . by travelling of the carriage 2, and can be inserted into or removed from the vertical cylinder 7, 13, or 13' in that position by operation of a lift means. A press frame 14 for grippingly supporting the upper plug 6 and the lower plug 8 is mounted on a carriage 15 and can travel on the track 1 and reciprocate between operating and retracted positions. The illustrated construction of the press frame 14 is a mere example, and various modifications thereto may be made. For example, such may be hinged to a vertical fixed shaft and reciprocated between operating and retracted positions by a pivotal motion thereof.

Figure 2:
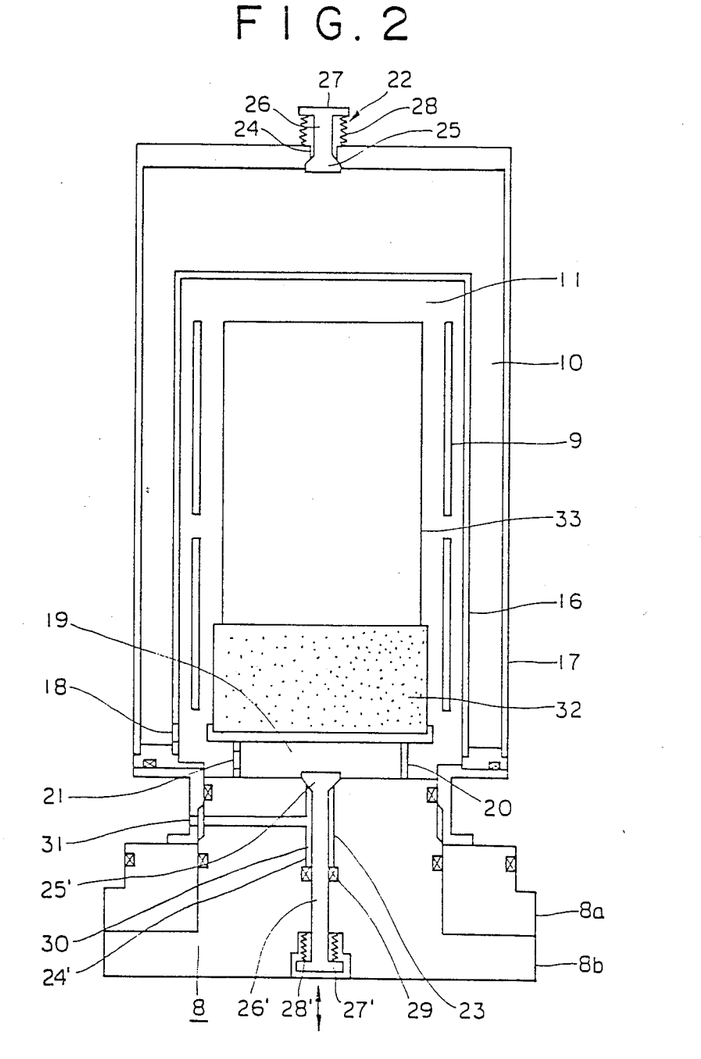
FIG. 2 is a schematic view of a treating chamber.

FIG. 2 is a schematic vertical section of the treating chamber 11 as a constituent member of the system of FIG. 1, in which a heat insulating barrier 10 internally provided with a heater 9 comprising an electric heating plate in an electrically insulated state is mounted on the upper surface of the lower plug 8. The power supply to the heater 9 is effected through a power lead wire (not shown) which is attached to the lower plug 8 in an electrically insulated and hermetically sealed condition. The heat insulating barrier 10 surrounding the treating chamber 11, including the heater 9, is formed of a heat-resistant fibrous heat insulator such as ceramic fiber filled between substantially concentric inverted cup-like hermetic casings 16 and 17 formed of a gas impermeable material. The heat insulating barrier 10 is gas permeable and it is mounted removably on the upper surface of the lower plug 8.

The heat insulating barrier 10 and the treating chamber 11 are in communication with each other through a through hole 18 formed in part of the hermetic casing 16. The upper surface of the lower plug 8 is covered with a heat insulating seat 19 of a similar structure to the heat insulating barrier 10, and a hermetic casing 20 which forms an outer periphery of the heat insulating seat 19 is also formed with a through hole 21 to provide communication between the seat 19 and the treating chamber 11.

Further, the greatest feature of the present invention resides in that at least one valve mechanism is provided in each of upper and lower portions of the treating chamber 11 thereby permitting communication and cut-off between the interior and exterior of the treating chamber 11. In the illustrated embodiment, one valve mechanism 22 and one similar mechanism 23 are provided in the top of the hermetic casing 17 and in the lower plug 8, respectively. It goes without saying that a plurality of such valve mechanisms may be provided in each of those portions.

The valve mechanism 22 comprises a valve 25 for opening and closing a valve hole 24 formed in the top of the hermetic casing 17 from the treating chamber 11 side, a stem 26 contiguous to the valve 25 and inserted slidably in the valve hole 24, and a flange 27 and the hermetic casing 17 is interposed a spring 28, and the step 26 is urged upward by the biasing force of the spring 28. In the lower valve mechanism 23, which is of about the same structure as above, a seal ring 29 is disposed in an intermediate portion of a valve bore 24' to prevent communication of the treating chamber 11 with the outside air when a valve 25' is opened. The diameter of the valve bore portion above the seal ring 29 is made a little larger than the outside diameter of a stem 26' to form an annular hole 30, and the treating chamber 11 communicates with an upper side space of the lower plug 8 through a conduction hole 31 extending sideways from the annular hole 30. The valves 25 and 25' are opened by urging the respective flanges 27 and 27' against the biasing force of springs 28 and 28' and are closed upon release of the biasing force.

In the modular type HIP system of the invention having the above construction, the heat insulating barrier 10 is separated from the lower plug 8 together with the hermetic casings 16 and 17 to open, the treating chamber 11, then a workpiece 33 is put on a sample stand 32, and thereafter the heat insulating barrier 10 is fixed onto the lower plug 8 to close the treating chamber 11. In this way, preparations are completed. The treating chamber 11 thus loaded with the workpiece 33 is then inserted into the vertical cylinder 13 of the auxiliary station 4.

Figure 3:
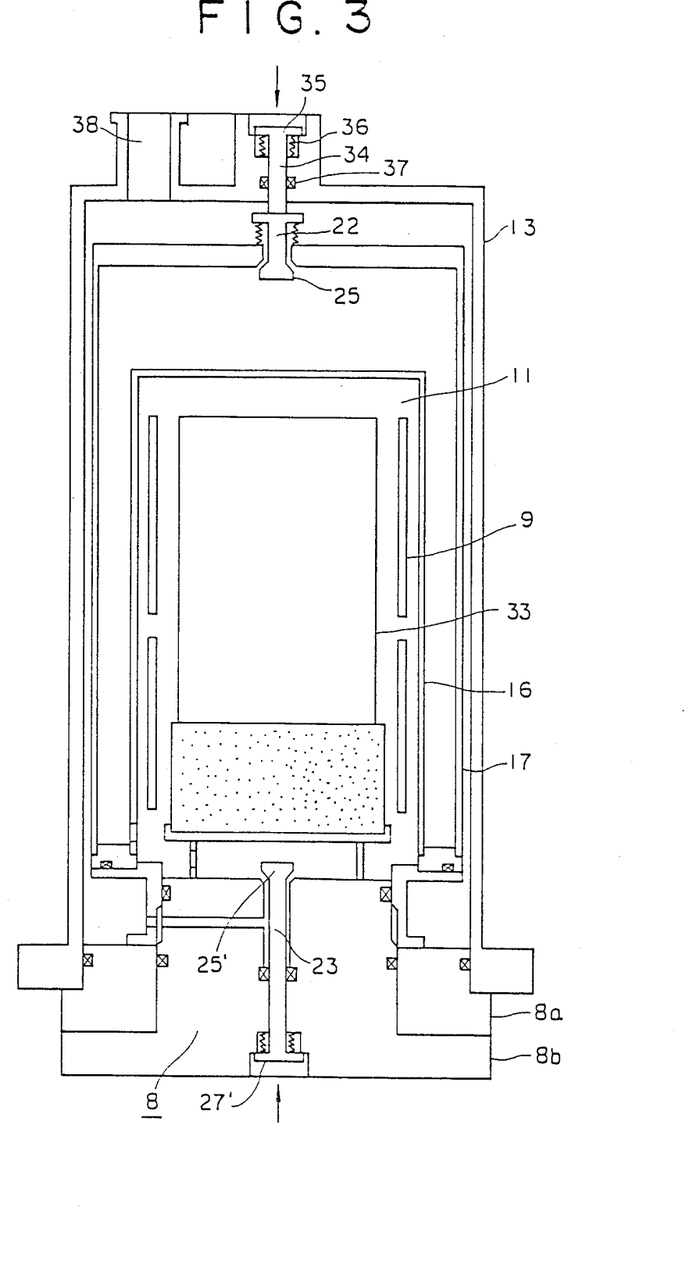
FIG. 3 is a schematic view of the treating chamber as received in an auxiliary chamber.

FIG. 3 is a schematic vertical section of the treating chamber 11 as received in the auxiliary station 4, in which a push rod 34 is provided in the top of the vertical cylinder 13 in a position coaxial with the valve mechanism 22, and it is urged upward by the biasing force of a spring 36 which acts on an upper end flange 35, the push rod 34 being mounted hermetically through a seal ring 37. Further, the vertical cylinder 13 is provided with a gas supply and discharge port 38 which communicates with a vacuum exhaust system and a gas supply/discharge system (neither shown).

In such auxiliary station 4, the work 33 is first subjected to a required heat treatment. For example, in vacuum sintering of a formed body of powder, the flanges 27' and 35 are pushed by suitable means to open the upper and lower valves 25 and 25', as shown in FIG. 3, then the heater 9 is charged with electricity while vacuum suction is performed through the gas supply and discharge port 38. Alternatively, after replacing the vacuum with an inert gas such as argon or nitrogen, the upper and lower valves 25 and 25' are closed to seal the inert gas in the hermetic casing 17, thereby performing an atmospheric sintering. In the case of oxide type ceramics, there may be used a gaseous mixture consisting of inert gas such as Ar or $N_2$ and a very small amount of $O_2$.

After completion of the above heat treatment, and where the interior of the treating chamber 11 is vacuum, after replacing it with a predetermined gas, the lower plug 8 is removed from the lower opening of the vertical cylinder 13 together with the workpiece 33, treating chamber 11 and hermetic casings 16 and 17, which are then transferred to the HIP furnace in a hot state of the treating chamber 11 and inserted into the furnace interior from the lower opening of the vertical pressure-resistant cylinder 7. During their transfer, both the upper and lower valves 25 and 25' are closed as shown in FIG. 2 and the interior of the treating chamber 11 can be maintained with a predetermined gas atmosphere. Therefore, materials which are susceptible to oxidation at elevated temperatures despite being stably employable at elevated temperatures in a non-oxidative atmosphere can be used for the heating element, etc.

Figure 4:
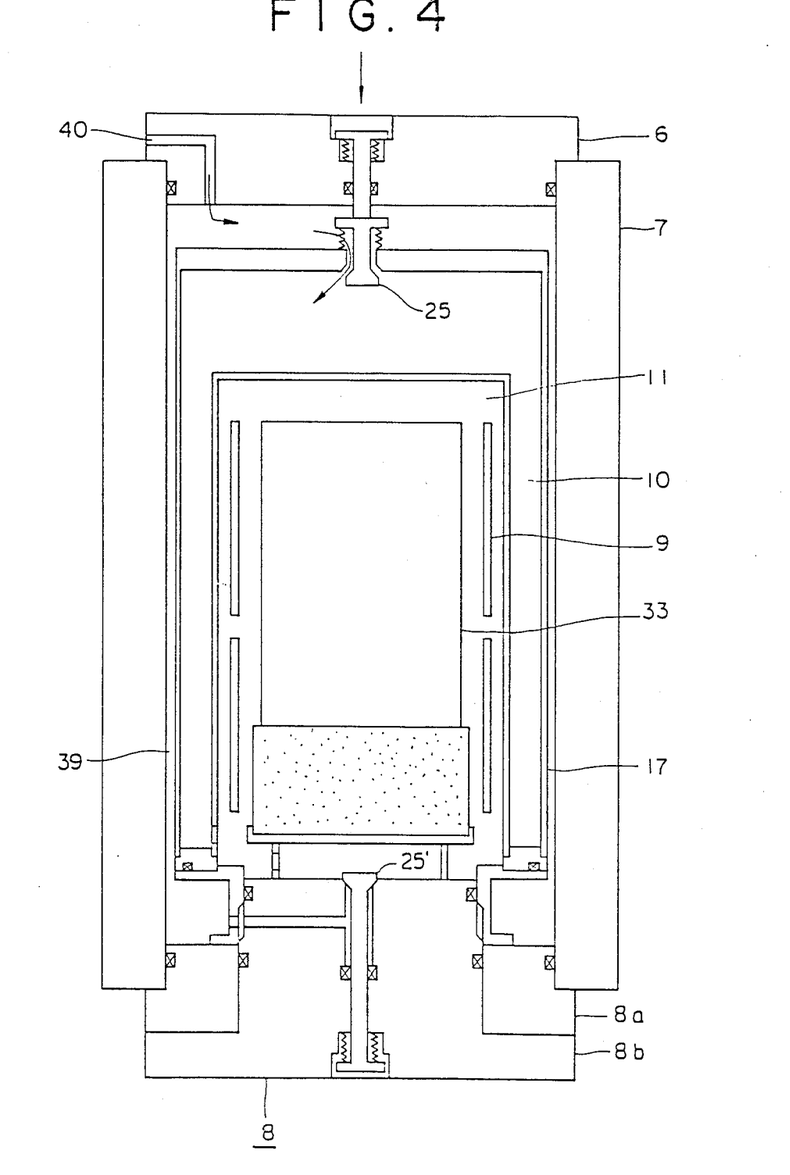
FIG. 4 is a schematic view of the treating chamber as received in an HIP furnace and under HIP treatment.

FIG. 4 is a schematic vertical section of the treating chamber 11 as received in the vertical pressure-resistant cylinder 7 of the HIP furnace 5, in which the HIP furnace 5 comprises the cylinder 7 and the upper plug 6 which seals the upper end of the cylinder 7, with the lower plug 8 being hermetically fitted in the lower end of the cylinder 7, thereby forming a high pressure chamber 39 in the interior of the cylinder.

In the upper plug 6 is formed a gas flow path or conduit 40 for supply and discharge of a gaseous pressure medium. In the illustrated embodiments the vertical pressure-resistant cylinder 7 is supported and fixed by a support structure (not shown), and the upper and lower plugs 6 and 8 are grippingly supported by the press frame 14 to prevent their disengagement during operation. The plugs may be fixed to the pressure-resistant cylinder by conventional means such as a threaded engagement, but the press frame gripping method is most recommended from the standpoint of ensuring safety in operation at high pressures.

In the apparatus of such structure, the treating chamber 11 whose interior is in a hot state is inserted into the vertical pressure-resistant cylinder 7 by fitting the lower plug 8 which carries thereon the treating chamber 11 hermetically into the lower end of the cylinder 7. In this state, the valve 25 is opened and the valve 25' closed, and the gaseous pressure medium is introduced through the conduit 40 into the pressure chamber 39, while the heater 9 is charged with electricity to continue heating and raise the internal temperature of the furnace thereby performing HIP treatment.

The pressurization is effected at a high pressure of at least about 500 atm using a gaseous pressure medium comprising an inert gas such as argon or helium gas alone or in combination with a small amount of oxygen, and as a high temperature is adopted sufficient to cause a plastic flow of the constituent material of the work such as ceramics or metal, but in the method of the present invention, the temperature range of about 1,200°–2,000° C. is applied very effectively to the high efficiency and high temperature HIP treatment. By the HIP treatment, the workpiece is more densified and there is obtained a formed body of a high density close to the theoretical density.

Figure 5:
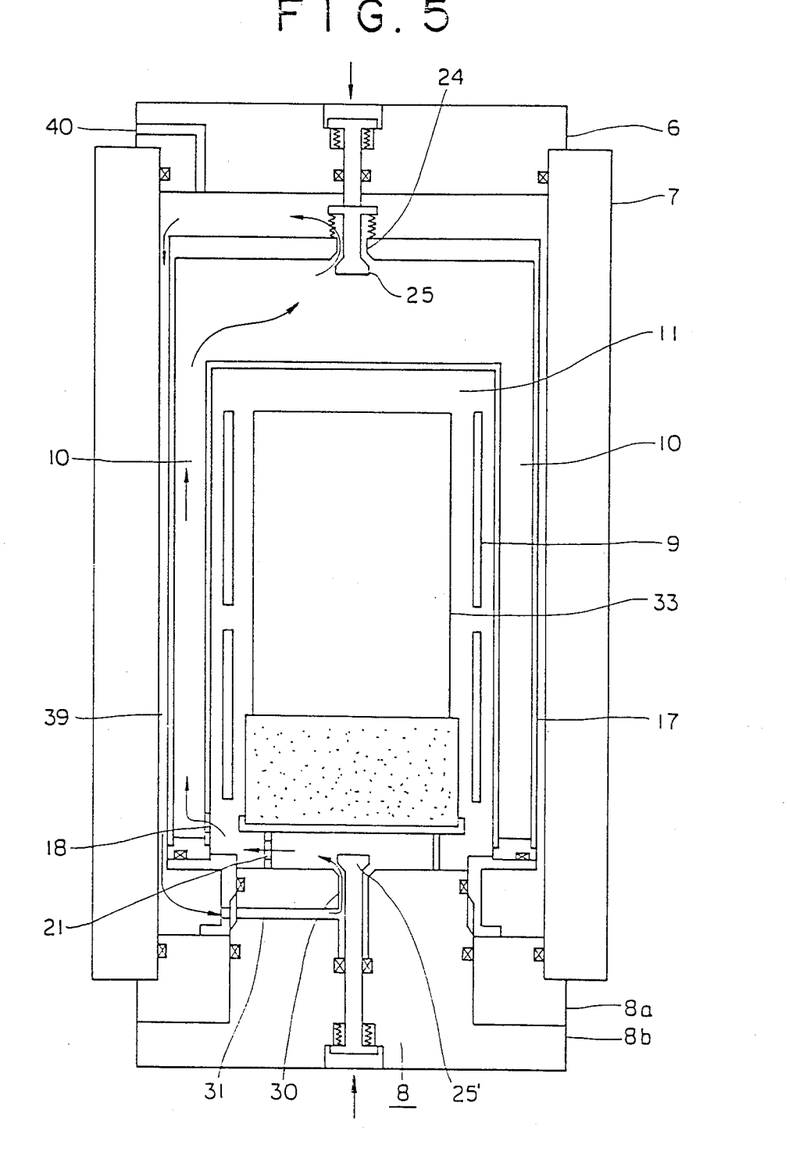
FIG. 5 is a schematic view of the treating chamber under rapid cooling in the HIP furnace.

FIG. 5 is a schematic vertical section showing a forced cooling step which is carried out in the HIP furnace after completion of the HIP treatment. As shown in the figure, upon completion of the HIP treatment, the lower valve 25' is opened without reducing the pressure, and now both the upper and lower valves are open, whereby a circulating gas stream is created by convection of gas along the arrowed path in the figure. More particularly, the gas in the high pressure chamber 39 which has been cooled in contact with the inner wall of the vertical pressure-resistant cylinder 7 goes downward, then passes through the conduction hole 31, annular hole 30 and through hole 21 and enters the treating chamber 11, where it absorbs the interior heat, then passes through the through hole 18 and heat insulating barrier 10 and again flows into the high pressure chamber 39 from the valve hole 24 and radiates heat.

According to the conventional HIP method, not of a modular type, the interior of the HIP furnace must be cooled to the temperature which permits opening to the outside air, namely, about 200° C. or lower, and as the temperature lowers, the lowering rate becomes smaller, as reflected in a long time of about 8 hours required for the temperature lowering operation. After the adoption of a modular type HIP method, it became possible to perform only pressure reduction after HIP treatment, transfer the treating chamber as heated still hot to an auxiliary station and cool it to a predetermined temperature in that station. However, since there scarcely occurs convection of gas in the vicinity of the atmospheric pressure, a long period of time is required for cooling, for example, about 10 hours is required for lowering the temperature from 600° C. to 300° C. Consequently, there arises the necessity of increasing the number of auxiliary stations sufficiently to improve the utilization efficiency of the HIP furnace, or various improvements are needed for the forced cooling in auxiliary stations, thus leading to increase of the equipment cost. Additionally, the seal ring of the HIP furnace is apt to be damaged because the treating chamber as heated hot is taken out, and this is a serious problem.

On the other hand, according to the foregoing method of the present invention, since cooling is done under high pressure after HIP treatment, there occurs a vigorous convection of gas, whereby the heat is absorbed rapidly and the workpiece is cooled in a surprisingly short time. For example, in the case of argon held at a pressure as high as 1,000 kg/cm$^2$, its viscosity is only 1.1 to 3 times that of argon gas at atmospheric pressure although the former has a density several hundred times that of the latter, so a slight temperature gradient would cause a vigorous convection, providing an extremely large value of convective heat conductivity, that is, the conduction efficiency from the workpiece to the intra-furnace atmosphere becomes very high. Actually, when the temperature was lowered from 600° C. to 300° C. in a high pressure argon gas atmosphere of 1,000 kg/cm$^2$, there was required only about one hour.

Preferably, the rapid cooling in the HIP furnace according to the method of the present invention is carried out until the temperature of the workpiece is not higher than about 300° C. After completion of the cooling step, the gaseous pressure medium is discharged from the conduit 40 to let the internal pressure of the furnace revert to normal pressure, then the press frame 14 is removed and the lower plug 8 is removed from the pressure-resistant cylinder 7 in a closed state of the upper and lower valves 25 and 25', then taken out from the HIP furnace 5 together with the treating chamber 11 and the workpiece 33 loaded therein and attached to the auxiliary station 4. In this case, since the temperature of the hermetic casing 17 which encloses the treating chamber 11 is also quite low, it is not possible at all that the seal rings and other portions of the vertical cylinders 7, 13 and 13' of the HIP furnace 5 and auxiliary stations 4, 4' will be badly influenced during mounting or removal. After further cooling as necessary in the auxiliary station 4, the workpiece 33 is taken out.

In the HIP system of the present invention, a coolant jacket may be mounted around the outer periphery of the vertical pressure-resistant cylinder 7 of the HIP furnace 5 to increase the cooling rate, and similar coolant jackets may be mounted around the outer peripheries of the vertical cylinders 13 and 13' of the auxiliary stations 4 and 4' to cause a forced circulation of the inside gas. The provision of these means is desirable for improving the function and effect of the method of the present invention although the equipment cost will be increased.

The lower plug 8 of an improved type used in the present invention will now be described with reference to FIGS. 1 to 5. As shown in these figures, the lower plug of this type comprises an outer annular plug 8a which holds thereon the hermetic casings 16 and 17, heat insulating barrier 10 and heater 9, and an inner plug 8b which is removably fitted in the outer annular plug 8a and which supports the workpiece 33 through the heat insulating seat 19 and sample stand 32.

Under such construction, at every loading or unloading of the work it is no longer necessary to remove the treating chamber 11 from the auxiliary station 4 and then separate the heat insulating barrier 10 from the lower plug 8; in other words, all that is required is only removing the inner plug 8b from the outer plug 8a while the treating chamber is received in auxiliary station 4, and thus the operation is extremely easy, affording great convenience. Where the lower plug 8 is of such a double structure, it is preferable in point of design and manufacture that the inner plug 8b be provided with the lower valve mechanism 23, and this is a matter of course.

Figure 6:
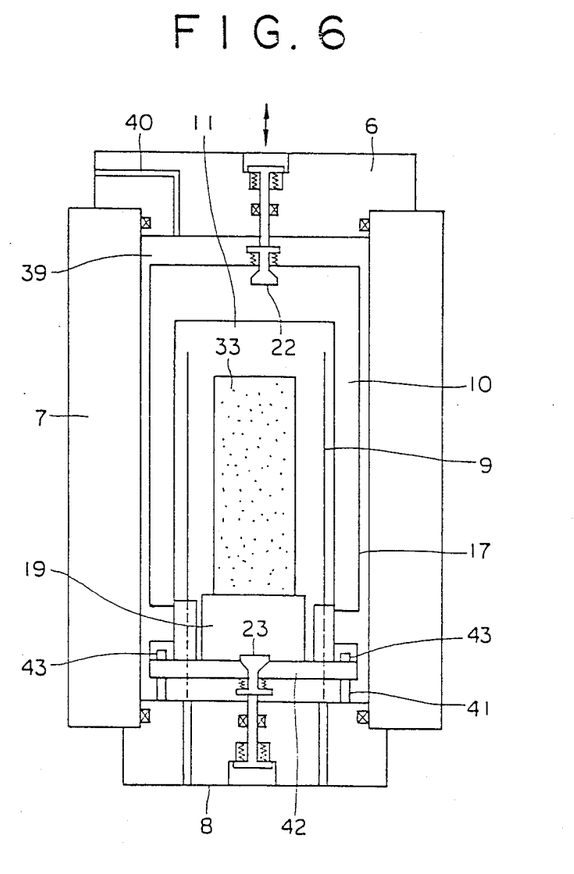
FIG. 6 is a schematic view of an HIP apparatus according to a modified embodiment of the present invention.

FIG. 6 is a schematic vertical section of an HIP apparatus according to another embodiment of the present invention. In the above embodiment illustrated in FIGS. 1 to 5, the heat insulating barrier 10, heater 9 and work 33 can be loaded and unloaded from the lower openings of the vertical cylinders 7, 13 and 13' together with the lower plug 8. On the other hand, in the embodiment of FIG. 6, the upper plug 6 is removed thereby permitting those portions to be loaded and unloaded from the upper openings of the vertical cylinders 7, 13 and 13'. As shown, a base plate 42 which serves as a part of the hermetic casing 17 is put on the lower plug 8 through support 41, and the lower end of the hermetic casing 17 is put on the base plate 42 through a seal ring 43. Further, the valve member 23 for communication and cut-off between the interior and exterior of the treating chamber 11 is mounted in the base plate 42. In this apparatus, the heat insulating barrier 10, heater 9, workpiece 33 and base plate 42 are loaded and unloaded from above the vertical cylinder in an integrally suspended state.

As the heater 9, there is used Ni-Cr wire, Fe-Cr-Al wire, molybdenum wire or graphite, selected according to the temperature used. But, molybdenum and graphite are most preferred from the standpoint of stability of operation at high temperatures. As the material of the hermetic casings 16, 17 and 20, there is used a gas impermeable material such as stainless steel, heat-resistant superalloy or molybdenum, selected according to the temperature used.

The following is a working example of the method of the present invention.

EXAMPLE

HIP treatment of high speed powder compact was performed using the lower loading type modular HIP system illustrated in FIGS. 1 to 5. First, in an auxiliary station, the upper and lower valve mechanisms were opened and the internal pressure of the treating chamber was brought to $10^{-1}$–$10^{-2}$ Torr by vacuum suction, then the interior atmosphere was replaced with argon gas, followed by a preliminary sintering at 1,000° C. for 1 hour in an argon atmosphere.

Then, the upper and lower valves 25 and 25' were closed to seal the argon gas in the treating chamber 11, which was then loaded into the HIP furnace 5 in a hot condition of the workpiece. Then, the upper valve 25 was opened and argon gas was introduced from the conduit 40. At the same time, the heater 9 was charged with electricity and the internal temperature and pressure of the treating chamber 11 were raised to 1,400° C. and 1,000 atm over a period of 3 hours. While maintaining the interior of the treating chamber in this state for about 2 hours, there was performed HIP treatment. Thereafter, the powder supply to the heater 9 was turned off and the lower valve 25' was opened to start cooling. In about one hour, the internal temperature of the HIP furnace was lowered to about 400° C., whereupon pressure reducing and argon gas recovering operation was started. The internal pressure was returned to normal pressure over a period of about one hour. At this time, the internal temperature of the HIP furnace was 290° C. Then, the upper and lower valves 25 and 25' were closed and the lower plug 8 was taken out together with the hermetic casings 16 and 17, heat insulating barrier 10 and work 33, and together loaded again into the auxiliary station 4. When the internal temperature was lowered to 200° C., the inner plug 8b was pulled out together with the workpiece 33. Molybdenum was used as the material of both the heater 9 and hermetic casings 16 and 17. Heating could be accomplished stably without sublimation of molybdenum in both the preheating stage and HIP treatment stage, and no substantial oxidation was recognized even after opening to the outside air.

In the method and apparatus of the present invention, as set forth hereinabove, the HIP treatment is performed in the combination of the movable treating chamber 11 with the HIP furnace 5, and after completion of the HIP treatment, rapid cooling is effected by utilization of a large convective heat conductivity induced by a vigorous convection of high pressure gas, then the treating chamber 11 is taken out from the HIP furnace 5. Consequently, damage and deterioration of the seal ring caused by opening of the furnace in a state of high temperature, which is a safety impeding factor, is eliminated completely. Besides, since it is possible to preheat the workpiece 33 in an auxiliary station and load the preheated workpiece as enclosed with a predetermined gas atmosphere in a hot state into the HIP furnace 5, not only the heat-up time in the HIP furnace 5 is shortened, but also the time of occupying the HIP furnace 5, especially the time required for lowering temperature, is shortened to a remarkable extent. As a result, the working efficiency of the entirety of the modular type HIP system is improved remarkably, and hence not only the cycle time is shortened but also the cooling step which has heretofore been conducted over a long time period in auxiliary stations can be arrived at in an extremely shorter time. Consequently, the number of auxiliary stations for one HIP furnace can be reduced, it is not necessary to use a preheating-dedicated furnace which is expensive, thus permitting a remarkable reduction of the equipment cost, and the loss of heat energy can be kept to a minimum.

Thus, the method and apparatus of the present invention have various advantages. The cycle time in the standard HIP treatment has heretofore been 15 hours and 20 minutes, while according to the present invention it is shortened to 8 hours and 20 minutes only through shortening of the time period for lowering of the temperature and is remarkably shortened to 7 hours if preheating is adopted at the same time. Particularly, in the HIP treatment at a high temperature region of 1,200° C. to 2,000° C., a specially outstanding effect is exhibited, thus greatly contributing to the improvement of productivity in the HIP treatment.

What is claimed is:

1. An apparatus for high efficiency hot isostatic pressing in a modular type not isostatic pressing system comprising:
 - a hot isostatic pressing furnace which comprises a high pressure vessel comprising a vertical, pressure-resisting cylinder having one closed end and a plug removably fitted closely in an opening poriton at the other end of said cylinder, and a treating chamber surrounded with a heat insulating barrier and capable of being loaded into and unloaded from said high pressure vessel together with a work enclosed therein, said heat insulating barrier being internally provided with a heater; said hot isostatic pressing furnace having a gas supply and discharge means for subjecting the work to a predetermined high temperature and high pressure treatment in a gas atmosphere;
 - an auxiliary station substantially comprising a vertical cylinder capable of enclosing therein and hermetically sealing said treating chamber, said auxiliary station having a gas supply and discharge means; and
 - a carrier device for carrying said treating chamber together with the workpiece between said hot isostatic pressing furnace and said auxiliary station and loading and unloading it from the vertical cylinders of said furnace and said auxiliary station, wherein said treating chamber is covered with a hermetic casing and in that at least one valve mehanism for providing communication and cut-off between the interior and exterior of said treating chamber is provided in each of upper and lower portions of the treating chamber.

2. An apparatus for high efficiency hot isostatic pressing according to claim 1, wherein said high pressure vessel comprises a vertical, pressure-resistant cylinder having a closed upper end and a lower plug removably fitted closely in an opening portion at the lower end of said cylinder, said heat insulating barrier is mounted on said lower plug, said vertical cylinder as the main constituent of said auxiliary station has a closed upper end and a lower-end opening portion which permits said lower plug carrying thereon said treating chamber to be fitted and fixed therein, and said treating chamber is loaded into and unloaded from said high pressure vessel and said auxiliary station from below the vessel and station together with the workpiece by attaching and detaching said lower plug to and from the lower-end opening portions of said vertical cylinders.

3. An apparatus for high efficiency hot isostatic pressing according to claim 2, wherein said lower plug comprises an annular outer plug which holds thereon said heat insulating barrier and said heater, and an inner plug which is removably fitted in said outer plug and which supports the workpiece.

4. An apparatus for high efficiency hot isostatic pressing according to claim 2 or claim 3, wherein the valve mechanism provided in the lower portion of the treating chamber is provided in said lower plug.

5. An apparatus for high efficiency hot isostatic pressing according to claim 3, wherein the valve mechanism provided in the lower portion of the treating chamber is provided in said inner plug.

6. An apparatus for high efficiency hot isostatic pressing according to claim 1, wherein said high pressure vessel comprises a vertical, pressure-resistant cylinder having a closed lower end and an upper plug removably fitted closely in an opening portion at the upper end of said cylinder, said treating chamber is mounted on a base plate disposed at the bottom thereof, said vertical cylinder as the main constituent of said auxiliary station has a closed lower end and an open upper end, and said treating chamber is loaded into and unloaded from said high pressure vessel and said auxiliary station from above the vessel and station together with the workpiece.

7. An apparatus for high efficiency hot isostatic pressing according to claim 6, wherein the valve mechanism provided in the lower portion of the treating chamber is provided in said base plate.

* * * * *